United States Patent
Andreoli et al.

(10) Patent No.: US 9,244,518 B2
(45) Date of Patent: Jan. 26, 2016

(54) MULTI-MODE DEVICE POWER-SAVING OPTIMIZATION

(71) Applicant: XEROX Corporation, Norwalk, CT (US)

(72) Inventors: Jean-Marc Andreoli, Meylan (FR); Yves Hoppenot, Notre Dame de Mesage (FR); Michael Niemaz, Saint Pierre d'Allevard (FR); Lionel Cazenave, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 315 days.

(21) Appl. No.: 13/721,605

(22) Filed: Dec. 20, 2012

(65) Prior Publication Data

US 2014/0181552 A1    Jun. 26, 2014

(51) Int. Cl.
*G06F 1/32* (2006.01)
*G06F 3/12* (2006.01)

(52) U.S. Cl.
CPC ............ *G06F 1/3234* (2013.01); *G06F 1/3206* (2013.01); *G06F 1/329* (2013.01); *G06F 1/3228* (2013.01); *G06F 1/3284* (2013.01); *G06F 1/3287* (2013.01); *G06F 3/126* (2013.01); *G06F 3/1221* (2013.01); *G06F 3/1285* (2013.01); *Y02B 60/1267* (2013.01); *Y02B 60/1271* (2013.01); *Y02B 60/1282* (2013.01); *Y02B 60/144* (2013.01)

(58) Field of Classification Search
CPC ............... G06F 1/00; G06F 1/04; G06F 1/12; G06F 1/26; G06F 1/32; G06F 11/30; G06F 15/16
See application file for complete search history.

(56) References Cited

U.S. PATENT DOCUMENTS

| | | | | |
|---|---|---|---|---|
| 5,396,635 | A | * | 3/1995 | Fung .............................. 713/323 |
| 5,521,896 | A | * | 5/1996 | Bajorek et al. ............. 369/53.18 |
| 5,774,292 | A | * | 6/1998 | Georgiou et al. ........... 360/73.03 |
| 5,983,355 | A | * | 11/1999 | Kenny et al. ................... 713/322 |
| 5,991,635 | A | | 11/1999 | Dent et al. |
| 6,032,004 | A | | 2/2000 | Mirabella, Jr. et al. |
| 6,608,729 | B1 | * | 8/2003 | Willems et al. ................. 360/69 |

(Continued)

OTHER PUBLICATIONS

U.S. Appl. No. 13/308,780, filed Dec. 1, 2011, Andreoli et al; Multi-device Powersaving.

(Continued)

*Primary Examiner* — Chun Cao
*Assistant Examiner* — Mohammad A Rahman
(74) *Attorney, Agent, or Firm* — Gibb & Riley, LLC

(57) ABSTRACT

Methods and systems input an energy consumption profile for each of a plurality of different sleep modes available for a device, and input a probability distribution of interjob times for the device. The methods and systems then compute the optimal time-out period for each sleep mode based on the energy consumption profile of each sleep mode and the probability distribution of interjob times. Further, such methods and systems monitor the usage of the device to determine the current interjob time, and switch between sleep modes to relatively lower power sleep modes as the current interjob time becomes larger.

25 Claims, 5 Drawing Sheets

(56) References Cited

U.S. PATENT DOCUMENTS

| | | |
|---|---|---|
| 7,178,045 B2 | 2/2007 | Puffer et al. |
| 7,751,858 B2 | 7/2010 | Chou |
| 7,874,664 B2 | 1/2011 | Gervasi et al. |
| 8,131,324 B2 | 3/2012 | Hossain et al. |
| 8,230,248 B2 | 7/2012 | Dance et al. |
| 8,417,979 B2 * | 4/2013 | Maroney .................. 713/323 |
| 2005/0260768 A1 * | 11/2005 | Cawse ...................... 436/518 |
| 2007/0223028 A1 | 9/2007 | Boyes, Jr. et al. |
| 2011/0010571 A1 * | 1/2011 | Dance et al. ............. 713/323 |
| 2011/0063094 A1 * | 3/2011 | Meiertoberens et al. .... 340/12.5 |
| 2011/0231320 A1 * | 9/2011 | Irving ........................ 705/80 |
| 2014/0023127 A1 * | 1/2014 | Pereira ...................... 375/224 |

OTHER PUBLICATIONS

Jean-Marc Andreoli et al., Multi-Mode Device Powersaving Optimisation, Jul. 18, 2012, pp. 1-5.

Victor Ciriza et al., "Optimal Timeouts for Power Management Under Renewal or Hidden Markov Models Processes for Requests", hal-00412509, version 2-4 Jun. 2010, pp. 1-29.

* cited by examiner

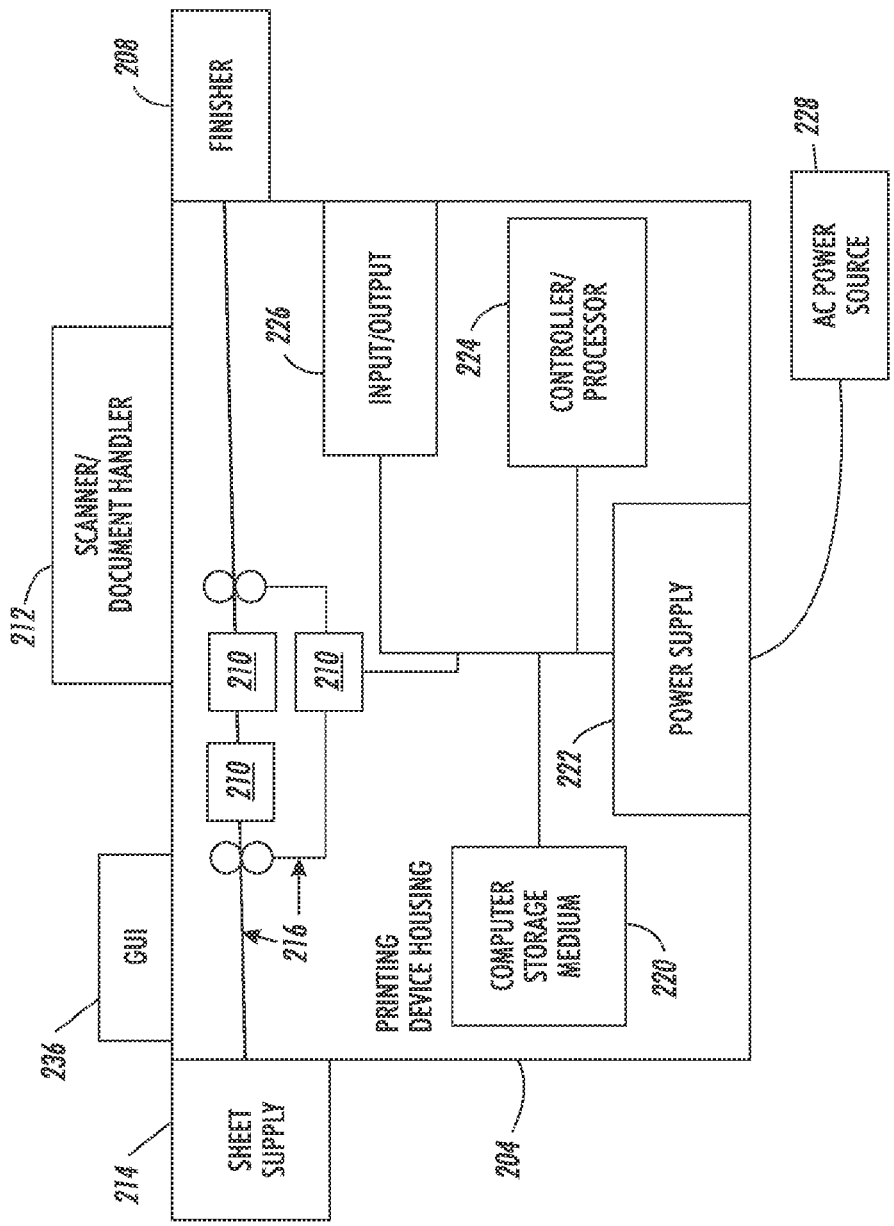

MULTI-MODE DEVICE POWER-SAVING OPTIMIZATION

BACKGROUND

Embodiments herein generally relate to using power saving sleep modes in devices and more particularly to methods and system for optimizing the use of such power saving modes.

The reduction of energy consumption is becoming a major issue in many areas. In addition to high quality solutions, customers are expecting "greener" products. This is particularly true for Managed Print Services contracts where the goal is to minimize the energy consumption of fleets of printers, but also for other types of devices such as air conditioning systems for facilities or ticketing devices for public transportation.

In view of this, manufacturers of devices, such as printing devices, are making greater use of power-saving modes to allow their devices to consume less power. Power savings modes are reduced-power modes that use less power than ready modes; however, in power saving mode, most device functions are not available. When entering power-saving modes, most devices disconnect the power being supplied to all but a few devices needed to recover from the power saving mode.

For example, an "active mode" (sometimes referred to as an operational mode) can be defined as the mode in which the device, while connected to a power source, is producing useful work. To clarify, the low end or minimum power draw of active mode is idle. The high end of active mode would be the maximum power draw capable by the device. The "idle state" (sometimes referred to as a ready mode, idle mode, standby mode, etc.) is the state in which the operating system is operational and warmed-up, the machine is not asleep, and activity is limited to those basic functions that the device starts by default. Idle state is considered a subset of the active mode. A "sleep mode" (sometimes referred to as a reduced-power mode) is a lower power state that a device enters automatically after a period of inactivity or by manual selection. A device with sleep capability can quickly "wake" in response to inputs. Devices may have more than one sleep mode. The lowest power consumption mode which cannot be switched off (influenced) by the user and that may persist for an indefinite time when the device is connected to the main electricity supply and used in accordance with the manufacturer's instructions is an "off mode."

Thus, power saving sleep modes only supply power to a few device elements to save power, yet allow the device to return to full operational mode (active mode) more quickly when compared to the time needed to reach full operational mode from a full off condition (where substantially all systems are disconnected from the power supply). The active power mode is one that provides the fastest operation, provides availability of all features, and consumes the most power. Different power saving modes consume different amounts of power, but all power saving modes consume less than the active mode, which consumes the most power. Such power saving sleep modes are begun when the device has not received any input from users or other devices within a specific time period (referred to commonly as a "time-out" period). Such sleep modes generally start a routine that saves certain information in the storage device, selects which items will be disconnected from the power supply, resets various flags, etc., and then disconnects the power supply from selected elements of the device that will not be powered during the sleep mode.

SUMMARY

An exemplary method herein inputs an energy consumption profile for each of a plurality of different sleep modes available for a device, and inputs a probability distribution of interjob times for the device. This method then automatically computes the optimal time-out period for each sleep mode based on the energy consumption profile of each sleep mode and the probability distribution of interjob times. Further, such a method automatically monitors the usage of the device to determine the current interjob time, and automatically switches between sleep modes to relatively lower power sleep modes as the current interjob time becomes larger.

Another exemplary method inputs an energy consumption profile for each of the sleep modes, which is based on the power savings produced by the sleep mode and a transition power cost required to return from the sleep mode to the ready mode. Further, the method inputs the probability distribution of interjob times, which is based on historical training data and/or empirical data. An "interjob" time is the time period of inactivity between the end of a job and the beginning of a new job, triggered by a new request for activity made to the device. Strictly speaking, the time period between requests is the inter-arrival time: it is the period between the beginning of two consecutive non-overlapping jobs. If job time is considered negligible, then inter-arrival time is a good approximation of the inter-job time (period of inactivity between the end of a job and the beginning of the next).

The method then can automatically compute the optimal time-out period for each sleep mode based on the energy consumption profile of the sleep mode and a probability distribution of interjob times. The probability distribution of interjob times can be different for different times of the day, days of the week, days of the month, days of the year, etc. Therefore, the optimal time-out period for each of the sleep modes can also be different for different times of the day, days of the week, days of the month, days of the year, etc.

Once the optimal time-out period for each sleep mode has been computed, the method automatically monitors the current usage of the device to determine the current interjob time, and the method progressively automatically switches between the sleep modes (each time switching to a relatively lower power mode) as the current interjob time becomes larger. Therefore, the method first switches from the ready mode to one of the sleep modes when the current interjob time reaches the shortest optimal time-out period. Then, the method switches to a lower power sleep mode when the next shortest optimal period expires, and the method continues to switch down through successive sleep modes that have longer and longer optimal time-out periods until the method finally switches to the lowest power sleep mode when enough time-out time has expired.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 5 is a side-view schematic diagram of a device according to embodiments herein.

DETAILED DESCRIPTION

Figure 1:
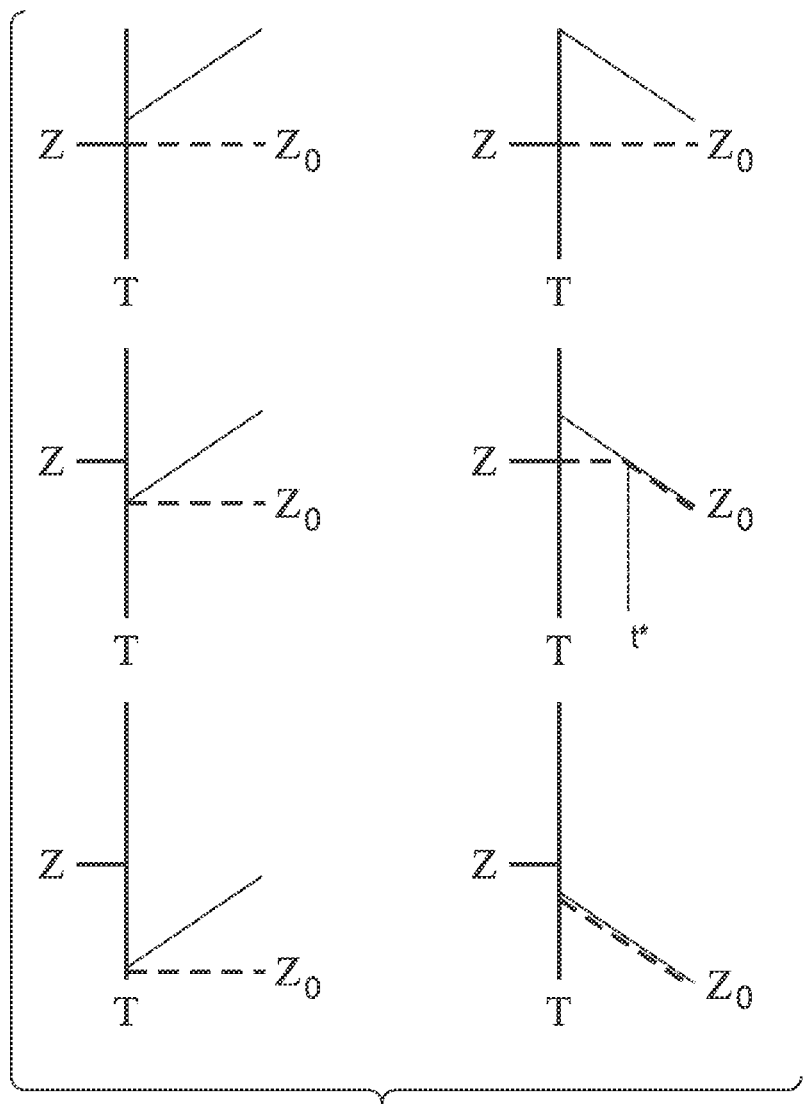
FIG. 1 illustrates various graphs showing a procedure herein implemented with primitives.

As mentioned above, the reduction of energy consumption is becoming a major issue in many areas. In order to respond to this expectation, the methods and systems herein capitalize on the fact that devices have different levels of energy consumption which can be adjusted according to the expected usage: for example, a printer consumes less energy in sleep mode while it is waiting for a new document to print, but on the other hand, if this mode is used, additional energy will be needed to return to print mode (i.e. to "wake up" the device). In order to optimize the overall energy consumption, the methods and systems herein optimally adjust the time-out delay after which the device must be switched to a lower consumption mode. While a brute force search to reach this optimum is possible in the case of one sleep mode, it becomes prohibitively expensive in the case of K modes: the complexity is $N^K$ where N is the number of time-outs to test.

The methods and systems herein reduce the complexity of the optimal multi-time-out calculation, from $N^K$ to $KN$, where N is the number of different time-out accepted by the device and K the number of modes. The methods and systems herein work both when the timeouts are unconstrained and when they are constrained to a finite set of available values. Currently, for the most complex print devices, K does not exceed 2, but some accept up to 10 or more different time-outs. Furthermore, the methods and systems herein deliver optimal time-outs with an exemplary precision to the minute up to one hour, so N can be 60. With the methods and systems herein it is possible to have a much finer precision (even to the second) for every time-out, without impacting dramatically the calculation time: N becomes 3600, where, even in the simple case K=2, brute force search is computationally costly.

A brute force search method implements an oracle of the expected cost function and tries it on all the possible K-combinations of time-outs, hence with complexity $N^K$. Even taking into account the constraint that the time-outs must be in increasing order does not significantly reduce the complexity (it is only divided by K but remains polynomial in N of the same degree). Even in an offline setting, where the computation of the optimal cost for one configuration is infrequent, it is useful to reduce its complexity, because it may need to be repeated for many configurations, corresponding to different device profiles, different conditions on the demand (e.g. per time of day or other observable conditions), etc. Furthermore, in the future, it may be that the devices are capable of running the computation of their optimal time-outs online, in which case the issue of complexity becomes crucial. The methods and systems herein express the expected cost function as a sum of independent terms, one for the time-out of each mode, coupled only by the constraint that these time-outs are in increasing order.

The methods and systems herein optimize use of energy saving modes of a device by controlling the device's time-out periods (the period of time after the end of a print job during which the device remains in "ready" mode). After the time-out, the device switches to a low energy consumption mode, usually called the "sleep" mode. The methods and systems herein generalize this result to the case of a device with multiple low energy consumption modes.

The controller is given a probability distribution P of inter-job times as well as a description of the energy consumption profile of each device mode. The inter-job time distribution P can be generic or conditioned to a specific observable state of the world in which the job demand occurs (time of day, of week, of year etc., but also other specific conditions could be used).

Making P conditional results in more accurate optimizations, since time-out and mode control can also be conditioned on the state. However, making P conditional is useful only if control can effectively be made dependent on the state. This may require extra communication between the controller and the device, to inform the latter of changes of state, which may simply be impossible, or may generate network traffic at a cost. Furthermore P is learnt from data, so the more restrictive the conditioning on the state, the less data will be available that match these conditions, hence the less accurate the estimation.

Strictly speaking, an inter-job time is the time between the end of a print phase and the start of the next print phase on the device. If this data is not directly available, it can be approximated by the time between job requests (inter-arrival time), which may be more readily available from print servers rather than the device: this amounts to ignoring the job printing time and potential queuing effects.

Some methods assume just two modes (other than the print mode): ready and sleep. For example, see U.S. Pat. No. 8,230,248, the disclosure of which is incorporated herein by reference. Instead, the methods and systems herein consider here a set of K+1 modes with a specific power level $\bar{a}_k$, assumed constant, for each mode k=1 . . . K+1. The methods and systems herein assume that the modes are sorted by decreasing power, i.e. $(\bar{a}_k) k=1 \ldots K+1$ is strictly decreasing. If there were no mode transition costs, the optimal strategy would be to jump directly to the lowest consumption mode K+1. Some methods and systems herein assume that there is a fixed cost associated with each mode transition, which includes energy (e.g. to warm-up some components), user impact (waiting time) etc. The methods and systems herein further assume that the cost of mode transitions in the same direction is additive, i.e. the cost of the transition $k_1:k_2$ is the sum of the costs of transitions $k_1:h$ and $h:k_2$, whenever $k_1,h,k_2$ are sorted (by increasing or decreasing values). In these conditions, it is easy to show that an optimal control is entirely given by a loosely increasing sequence $(\tau_k) k=1 \ldots K$ of time-outs with the following meaning:

Immediately after a print (at time 0), set mode 1. For k=1 . . . K

Remain in mode k until time k then transition to mode k+1 Remain in mode K+1 forever after.

This loop is asynchronously interrupted and reset by the arrival of a print job. Note that setting $\tau_k=\tau_{k-1}$ (or 0 if k=1) amounts to skipping state k. The mode transition costs are entirely captured by a vector $(b_k)_{k=1 \ldots K}$ where each $b_k$ is the cumulated cost of transitions k:k+1 and k+1:k for k=1 . . . K. This is a simple way to account for the fact that the control must always return to mode 1 when a new job arrives, so each transition k:k+1 is always eventually compensated at the end by a transition k+1:k.

The solution is presented as follows:

Given P, $(\bar{a}_k)_{k=1 \ldots K+1}$ and $(b_k)_{k=1 \ldots K}$, let $c(x;\tau)$ be the cost rate at time x under control $\tau=(\tau_k)_{k=1 \ldots K}$. The optimal control is obtained by minimizing over $\tau$ $$E_{x:P}\left[\int_{u=0}^{x} c(u;\tau)du\right] =$$

$$E_{x:P}\left[\int_{u} \mathbb{1}[u<x]c(u;\tau)du\right] = \int_{u} \underline{E_{x:P}[\mathbb{1}[u<x]]}c(u;\tau)du$$

The underlined term is in fact the complementary cumulative distribution function $\psi'$ associated to P, thus the objective function is $\int_u \psi'(u)c(u;\tau)du$. Function $\psi'$ and its primitive $\psi$ are defined by:

$$\psi'(t) =_{def} \int_x I[t<x]dP(x)$$

$$\psi(t) =_{def} \int_0^t \psi'(u)du = \int_x \min(x,t)dP(x)$$

Now, by definition, the cost rate function c is given by $$c(u;\tau) = \sum_{k=1}^{K=1} \mathbb{1}[\tau_{k-1} \le u < \tau_k]\bar{a}_k + b_k \delta_{\tau k}(u)$$

where $\delta$ is the Dirac density, $\tau$ is implicitly extended with $\tau_0=0$ and $\tau_{K+1}=\infty$ and $b_{K+1}=0$. Hence $$\tau^* = \operatorname{argmin}_\tau \sum_{k=1}^{K+1} \bar{a}_k \int_{\tau_{k-1}}^{\tau_k} \psi'(u)du + b_k \psi'(\tau_k) =$$

$$\operatorname{argmin}_\tau \sum_{k=1}^{K+1} \bar{a}_k(\psi(\tau_k) - \psi(\tau_{k-1})) + b_k \psi'(\tau_k) =$$

$$\operatorname{argmin}_\tau \left(\sum_{k=1}^{K} (\bar{a}_k - \bar{a}_{k+1})\psi(\tau_k) + b_k \psi'(\tau_k)\right) + \underbrace{\bar{a}_{K+1}\psi(\infty) - \bar{a}_1\psi(0)}_{\text{independent of } \tau}$$

Finally, the methods and systems herein get $$\tau^* = \operatorname*{argmin}_{0 \le \tau_1 \le \ldots \le \tau_K} \sum_{k=1}^{K} g_k(\tau_k) \quad (1)$$

where $g_k =_{def} a_k\psi + b_k\psi'$ $a_k =_{def} \bar{a}_k - \bar{a}_{k+1}$

The objective function in (1) looks like a decoupled sum of terms, so it is tempting to optimize separately each term in the sum. However, coupling is implicit through the constraint that $\tau$ must be non-decreasing. Still, the optimization can be performed incrementally as follows. The methods and systems herein use the following notations, for any $k=0 \ldots K$ and any function $f$ of time:

$$g_k^*(t) =_{def} \min_{0 \le \tau_1 \le \ldots \le \tau_k \le t} \sum_{h=1}^{k} g_h(\tau_h)$$

$$\downarrow f(t) =_{def} \min_{0 \le \tau \le t} f(\tau)$$

Now, observe that the optimal value of the objective (1) is given by $g_K^*(\infty)$. The methods and systems herein first show that:

$g_0^* = 0$ $g_k^* = \downarrow(g_{k-1}^* + g_k)$ (2)

Indeed, using the decomposition of the objective (1) into a sum of independent terms, the methods and systems herein have, for any $k=1 \ldots K$ and $t \ge 0$: $g_k^*(t) = \min_{0 \le \tau_1 \le \ldots \le \tau_k \le t} \sum_{h=1}^{k-1} g_h(\tau_h) + g_k(\tau_k) = \min_{0 \le \tau_k \le t} g_k(\tau_k) + \min_{0 \le \tau_1 \le \ldots \le \tau_{k-1} \le \tau_k} \sum_{h=1}^{k-1} g_h(\tau_h) = \min_{0 \le \tau_k \le t} g_k(\tau_k) + g_{k-1}^*(\tau_k) = \downarrow(g_k + g_{k-1}^*)(t)$ Thus $g_k^*$ can be computed by upward propagation (2) for $k=1 \ldots K$, at the end of which the optimal value of the objective (1) can be computed as $g_K^*(\infty)$. Conversely, the argument $\tau^*$ at which this optimum is reached can be obtained by downward propagation for $k=K \ldots 1$:

$\tau_{K+1}^* = \infty$ $$\tau_k^* = \operatorname{argmin}_{t \le \tau^*_{k+1}}(g_{k-1}^* + g_k)(t) = \min \operatorname{argmin}_{t \le \tau^*_{k+1}} g_k^*(t) \quad (3)$$

In one implementation (which is a generic solution) the methods and systems herein perform the following. Let $\mathcal{F}$ be the space of functions (on $R^+$) spanned by $1, \psi, \psi'$. Let $\mathcal{F}^*$ be the space of functions that are piecewise $\mathcal{F}$, i.e. of the form $\Sigma_{i \in I} 1_{D_i} f_i$ where $(f_i)_{i \in I}$ is a finite family of functions in $\mathcal{F}$ and $(D_i)_{i \in I}$ is an interval partition of $R^+$. Each function in $\mathcal{F}$ can be finitely represented (e.g. by its three scalar components along $1, \psi, \psi'$), hence each function in $\mathcal{F}^*$ can also be finitely represented, as the list of bounds of its pieces $D_i$, and for each of them the (finite) representation of the corresponding element of $\mathcal{F}$.

Space $\mathcal{F}$ is stable by addition, and it is easy to show that so is space $\mathcal{F}^*$. Indeed, the methods and systems herein have $$\sum_{i \in I_1} 1_{D_{1i}} f_{1i} + \sum_{i \in I_2} 1_{D_{2i}} f_{2i} = \sum_{i_1 \in I_1, i_2 \in I_2} 1_{D_{1i_1} \cap D_{2i_2}} (f_{1i_1} + f_{2i_2})$$

This provides an implementation of the addition in $\mathcal{F}^*$ based on that in $\mathcal{F}$ (the latter being straightforward).

Under the following assumption, (A) $\forall f \in \mathcal{F} \; \forall T \ge 0 \; \downarrow (1_{(T,\infty)} f) \in \mathcal{F}^*$ it can be shown that space $\mathcal{F}^*$ is also stable by operator $\downarrow$. Indeed, if $(f_i)_{i=1}^n$ is a finite family of functions in $\mathcal{F}$ and $(D_i)_{i=1}^n$ is an interval partition of $R^+$ where each $(D_i)$ is an interval $[T_{i-1}, T_i)$ (with $T_0=0$ and $T_n=\infty$), the methods and systems herein have $$\downarrow\left(\sum_{i=1}^{n} 1_{D_i} f_i\right) = \sum_{i=1}^{n} 1_{D_i} \bar{f}_i$$

where $(\bar{f}_i)_{i=1}^n$ is a family of functions defined recursively together with a family of scalars $(\dot{f}_i)_{i=1}^n$ as follows:

$\dot{f}_0 =_{def} 0 \; \bar{f}_i =_{def} \dot{f}_{i-1} + \downarrow (1_{[T_{i-1}, \infty)}(f_i - \dot{f}_{i-1})) \; \dot{f}_i =_{def} \bar{f}_i(T_i)$ By assumption (A), each $\bar{f}_i$ is in $\mathcal{F}^*$. This provides an implementation of operator $\downarrow$ on $\mathcal{F}^*$.

Hence, under Assumption (A), space $\mathcal{F}^*$ is stable by both addition and operator $\downarrow$. Therefore, by (2), all functions $g_k^*$ are in $\mathcal{F}^*$, and their representation can be computed.

This assumption (A) is rather mild and holds in most cases. Computationally, it is equivalent to having an implementation of procedure GLMB defined as follows: procedure Greatest Lower Monotonic Bound (GLMB), given scalars T, q, z, returns the representation in $\mathcal{F}^*$ of $z + \downarrow(1_{(T,\infty)}(\psi_q - z))$ where $\psi_q = \psi + q\psi'$.

Procedure GLMB can be derived from the following primitives. Procedure EVAL, given scalars q, t, returns the value of $\psi_q$ at t. Informally, EVAL(q,t) is a simple order 0 oracle of the value of $\psi_q$ at t.

Procedure TREND, given scalars q, t, returns the scalars s and u>t such that u is the largest number such that $\psi_q$ is either strictly decreasing on [t, u] (in which case s=−1) or loosely increasing on [t, u] (in which case s=1). Informally, TREND(q,t) is an order (almost) 1 oracle which gives the trend of $\psi_q$ on the right of t (upward: s=1 or downward: s=−1, s is essentially the sign of the derivative of $\psi_q$), but also the scalar u>t up to which this trend is continued. Observe that $$\operatorname{sgn}(\psi'_q) = \operatorname{sgn}\left(\frac{1}{q} - \eta\right)$$

where η is the hazard function associated with distribution P. Hence, procedure TREND can be computed by analysis of the hazard function.

Using primitives EVAL and TREND, procedure GDAB(T,q,z) can be implemented inductively as follows:

```
1     let t,s = TREND(q,T)
2     if s = +1 then
3         let z_o = min(z, EVAL(q,T))
4         let R = 1_[T,t) z_o
5     else   # hence, s = −1
6         let z_o = min(z, EVAL(q,t))
7         if z_o = z then let R = 1_[T,t) z
8         else if EVAL(q,T) ≤ z then let R = 1_[T,t) ψ_q
9         else   # hence, ψ_q(T) > z > ψ_q(t) and ψ_q
                  decreasing on (T,t)
10            let t* ∈ (T,t) such that ψ_q(t*) = z
11            let R = 1_[T,t*) z + 1_[t*,t) ψ_q
12    return R if t=∞ else R + GLMB(t,q,z_o)
```

FIG. 1 illustrates the case s=+1 (left) and s=−1 (right) with their different sub-cases. The green plain line denotes $\psi_q$ (shown linear, for clarity, but it may of course assume any shape respecting the same monotonicity given by s); the blue dashed line denotes $z + \downarrow(1_{(T,\infty)}(\psi_q - z))$, which is either constant (horizontal) or identical to $\psi_q$ (where the two lines overlap). For example, in the upper right corner of FIG. 1, $\psi_q$ is decreasing on the right of T up to t, but remains above z all over the interval (T,t). In that case, it is easy to show that $z + \downarrow(1_{(T,\infty)}(\psi_q - z))$ remains constant at z, as shown on the figure.

Note that at line 10 in procedure GLMB above, which corresponds to the middle right case in FIG. 1, one needs to find t*∈(T,t) such that $\psi_q(t^*)=z$. This can be done by simple bisection using procedure EVAL, since, precisely in that case, $\psi_q$ is strictly decreasing between T and t, starts above z at T and ends below z at t.

In some very specific cases, Equation (2) can be solved analytically.

If P is an exponential, i.e. $dP(x) = \exp(-\lambda x)dx$, the methods and systems herein have $$\psi'(t) = \exp(-\lambda t)$$

$$\psi(t) = \frac{1}{\lambda}(1 - \exp(-\lambda t))$$

$$g_k(t) = \left(b_k - \frac{a_k}{\lambda}\right)\exp(-\lambda t) + \frac{a_k}{\lambda}$$

In that case, $g_k^*$ is an exponential of the form $p_k\exp(-\lambda t) + q_k$. Equation (2) gives:

$$p_0 = 0$$

$$p_k = \min\left(p_{k-1} + b_k - \frac{a_k}{\lambda}, 0\right)$$

The optimal solution can be reconstructed by $k^* = \min\{k | \forall h \geq k\, p_h > 0\}$  $\tau_k^* = 0$ if $k < k^*$ else $\infty$ In other words, after a print phase, the device immediately jumps to mode k* and stays there forever (until the next print phase).

If P is discrete, i.e.

$$dP(x) = \frac{1}{n}\sum_{i=1}^{n}\delta_{T_i}(x)dx$$

the methods and systems herein have $$\psi'(t) = \frac{1}{n}\sum_{i=1}^{n}\mathbb{1}[t < T_i]$$

$$\psi(t) = \frac{1}{n}\sum_{i=1}^{n}\min(t, T_i)$$

A remarkable aspect is that $g_k$ and $g_k^*$ need only be computed at the points of the support set of the distribution, not in between. Hence $g_k$ and $g_k^*$ can be identified to the n-dimensional vectors of their values on the support set of the distribution. Equation (2) becomes straight forward vector operations.

If P is a histogram distribution, i.e.

$$dP(x) = \sum_{i=1}^{n}\frac{\omega_i}{T_i - T_{i-1}}\mathbb{1}[T_{i-1} \leq x < T_i]dx$$

where $\sum_{i=1}^{n}\omega_i = 1$, the solution is exactly similar to the previous case (discrete distributions): $g_k$ and $g_k^*$ need only be computed at the change points $(T_i)_{i=1}^{n}$ of the distribution and Equation (2) operates on n-dimension vectors. The complexity of the solution is of order $n^K$, i.e. the dimension of the vectors times the number of iterations in Equation (2). This is to be compared to a brute force method for solving Equation (1) by searching all the space, of dimension $n^K$ (taking into account the constraint $\tau_1 \leq \ldots \leq \tau_K$ yields the same complexity in n, only divided by some function of the number of modes K).

In one example, the methods and systems herein assume given three sets DATA, PROFILE, POLICY as follows:

Each element in DATA is a pair D, $f$ where D is a bag of interjob times, in no specific order, and $f$ is a method to fit arbitrary bags of positive numbers to a model, yielding a probability distribution over $R^+$. Bags D can be real data collected on a device, or simulated data generated by a distribution, which may or may not be of the class returned by $f$. The methods and systems herein have used Weibull and exponential distributions for the simulation, and exponential and histogram distribution class for fitting (with no smart optimization of the bins in the case of the histogram distribution class).

---
Procedure $_{PROTOCOL}$ 1   let H = ϕ ;
2   foreach D,f in $_{DATA}$
3      Split D into a training set T and a test set E
4      let d be the distribution obtained by fitting T according to f
5      foreach $a_{1:K}, b_{1:K}$ in $_{PROFILE}$
6         foreach p in $_{POLICY}$
7            let τ = p(d,($a_{1:K}, b_{1:K}$))
8            let r = Γ(τ,($a_{1:K}, b_{1:K}$),E) − min$_τ$Γ(τ,($a_{1:K}, b_{1:K}$),E)
9            append ((D,f),($a_{1:K}, b_{1:K}$)p,r) to H
10  return H

---

Each element in PROFILE is the pair of vectors $a_{1:K}$ and $b_{1:K}$ of same length, representing the energy profile of a device at its different modes. The methods and systems herein have used randomly generated profiles, with a specific recipe to focus on interesting parts of the space.

Each element in POLICY is a function which takes a distribution (over R+) and a profile, and computes a control, i.e. an assignment of time-outs for the modes of the profile knowing the distribution. The methods and systems herein have used the following policies:

The optimal policy computed by the method described herein.

The "all zero" policy: $τ_1 = \ldots = τ_K = 0$ (whatever the distribution).

The "all infinity" policy: $τ_1 = \ldots = τ_K = \infty$ (whatever the distribution).

The "decoupled LR" policy: compute $τ_0^* = 0$ then $$τ_k^* = \operatorname{argming}_k(τ).$$
$$\scriptstyle τ \geq τ_{k-1}^*$$

This amount to solving Equation (1) as if it were a decoupled problem an enforcing the constraint $τ_1 \leq \ldots \leq τ_K$ in a naive way.

The "decoupled RL" policy: compute $τ_{K+1}^* = \infty$ then $$τ_k^* = \operatorname{argming}_k(τ).$$
$$\scriptstyle τ \geq τ_{k+1}^*$$

Same as above with a reversed trick to enforce the constraint.

The protocol computes a performance measure (the "regret" r at line 8) for each combination of DATA, PROFILE, POLICY. The protocol mimics the envisaged use of the tool (similar to the methods and systems herein): a data collection phase, then a training phase on logged data, then a simulation on real data or an actual setting of devices. At line 8, function Γ(τ,($a_{1:K}, b_{1:K}$), E) denotes the actual cost of applying time-outs τ to a device with profile ($a_{1:K}, b_{1:K}$) submitted to interjob times E. Up to a multiplicative constant, it is exactly the objective of Equation (1) when the distribution is the empirical distribution associated to E. It is therefore easy to compute both its pointwise values, and its minimum using Equation (2).

The optimal policy presented here performs consistently better than the other policies, when fitting histogram distributions. When fitting exponential distributions, the results are more variable, but the optimal policy remains consistently better. When the data is specifically simulated according to the class of distributions used for training, the superiority of the optimal policy becomes more acute.

Computing the optimal policy for Weibull distributions, as is possible in the methods and systems herein, does not have a specific simplified solution, so it has to rely on the generic solution described above, where procedures EVAL and TREND are computed using the following formulas (the time unit is chosen to yield a rate of 1):

$$\psi'(t) = \exp(-t^\kappa)$$

$$\psi(t) = \frac{1}{\kappa}\gamma\left(\frac{1}{\kappa}, t^\kappa\right)$$

$$\eta(t) = \kappa t^{\kappa-1}$$

Figure 2:
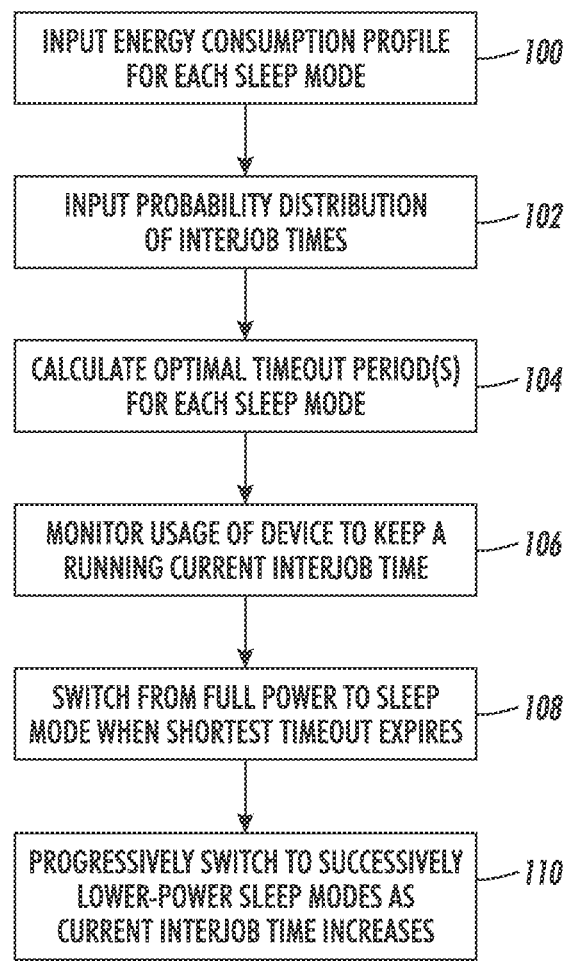
FIG. 2 is a flow diagram illustrating various processing performed by embodiments herein.

FIG. 2 is a flowchart illustrating an exemplary method herein that can be used with a device having different reduced-power modes (sleep modes). The power modes include a ready mode, active mode, and at least two reduced-power sleep modes. The sleep modes are in addition to any off mode (in which the device consumes substantially no power) and are reduced in power relative to the power consumption of the ready mode. Thus, the sleep modes consume some power, but consume less power than the ready mode.

Further, the time-out period that needs to expire before a sleep mode can be entered can be adjusted. A "time-out" period is an amount of time that the device performs no activity, after which the device is automatically changed from the ready mode (or from one of the sleep modes) to a relatively lower power sleep mode.

In item 100, this exemplary method inputs an energy consumption profile (that is specified by the manufacturer or previously computed by measurement) for each of the sleep modes based on the power savings produced by the sleep mode, and based on a transition power cost required to return from the sleep mode to the ready mode. Thus, as shown above, this energy consumption profile is the pair of vectors $a_{1:K}$ (power consumption costs) and $b_{1:K}$ (power transition costs, which can be user adjustable for user-specific optimization). Such vectors are of same length, and represent the energy profile of a device at its different modes.

Further, in item 102, this method inputs the probability distribution of interjob times that were previously computed based on historical training data and/or empirical data. As mentioned above each element in DATA is a pair D, f where D is a bag of interjob times, in no specific order, and f is a method to fit arbitrary bags of positive numbers to a model, yielding a probability distribution over R+. An "interjob" time is the time period between requests for activity made to the device.

The method then can automatically compute, in item 104, the optimal time-out period for each sleep mode based on the energy consumption profile of the sleep mode (100) and the probability distribution of interjob time (102). As shown above, each element in POLICY is a function that takes a distribution (over R+) and a profile, and computes a control, i.e. an assignment of time-outs for the modes of the profile knowing the distribution.

There can be different probability distributions of interjob times for different times of the day, days of the week, days of the month, days of the year, etc. Therefore, in item 104, there can be multiple optimal time-out periods for each of the sleep modes, one optimal time-out period for each time of the day, day of the week, day of the month, day of the year, etc.

Once the optimal time-out period for each sleep mode has been computed, the method automatically monitors the current usage of the device in item 106 to determine the current interjob time. In other words, item 106 keeps a running time amount since the last request was made (or the last activity in the most recent operating mode of the device) to keep a running current interjob time.

Then, in items 108-110, this exemplary method progressively switches between the sleep modes (each time switching to a relatively lower power mode) as the current interjob time becomes larger (the current interjob time continues to run and get larger, until a request is made of the device) until finally all time-outs expire and the device is placed in the lowest-power sleep mode.

Therefore, in item 108, the method first automatically switches from the full power (ready or active) mode to one of the sleep modes when the current interjob time reaches the shortest optimal time-out period. More specifically, in item 108, the device is automatically switched from full power to the sleep mode associated with the shortest optimal time-out period when the shortest optimal time-out period expires.

Then, in item 110, the method automatically switches to a lower power sleep mode when the next shortest optimal period expires. More specifically, in item 110, the device is automatically switched from the previous sleep mode to a different sleep mode associated with the next shortest optimal time-out period when the next shortest optimal time-out period expires. This process continues as the running current interjob time increases to progressively automatically switch to successively lower-power sleep modes.

Item 110 does not need to switch to all sleep modes and can skip some sleep modes if, for example, some sleep modes have the same (or similarly close) optimal time-out periods. One sleep mode can be set to have the same time-out as the next highest power sleep mode if such a sleep mode does not have an optimal time-out period, to cause such a sleep mode to always be skipped. Also, if desired, a switch will only be made between sleep modes if the different sleep modes are more than a previously set percentage (e.g., 5%, 10%, 25%, etc.) different from one another. In other embodiments, there can be a limit (3, 5, 10, etc.) as to how many switches can be performed, and after that limit is reached, the device immediately goes to the lowest power sleep mode.

Figure 3:
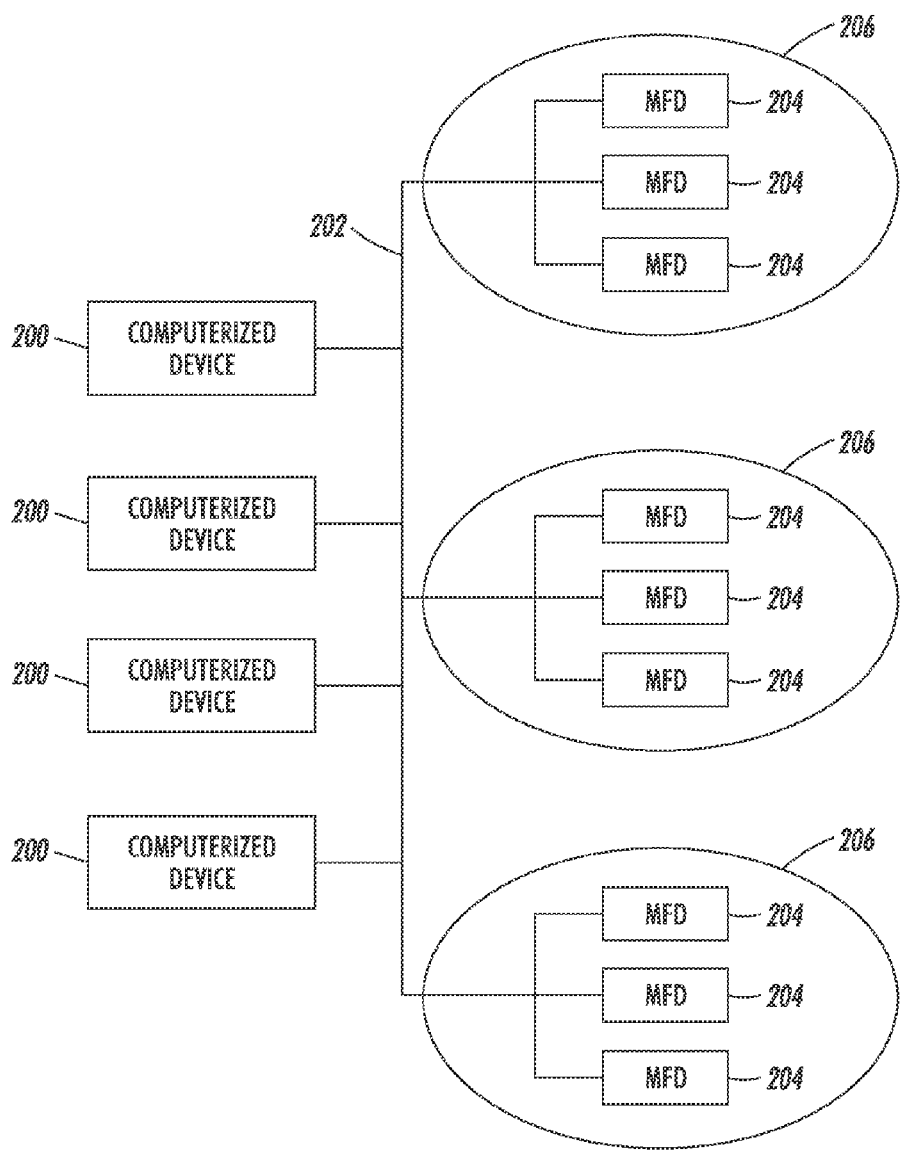
FIG. 3 is a schematic diagram of a network system according to embodiments herein.

As shown in FIG. 3, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 4:
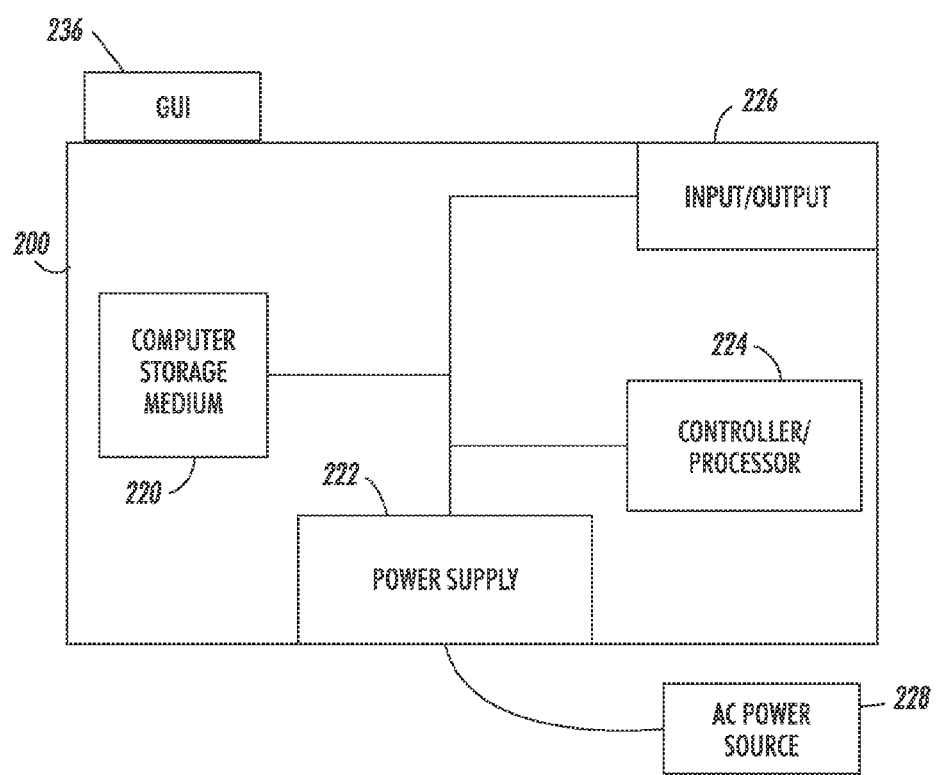
FIG. 4 is a side-view schematic diagram of a device according to embodiments herein.

FIG. 4 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory, tangible computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

FIG. 5 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operates on the power supplied from the external power source 228 (through the power supply 222).

Therefore, FIGS. 3-5 illustrate an interface 226 operatively (meaning directly or indirectly) connected to at least one device 200, 204 external to the computerized device 200, 204, and a processor 224 operatively connected to the interface 226. One device 200, 204 can control the time-out periods of many other devices 200, 204, or individual devices can control their own time-out periods. The processor 224 receives, through the interface 226, an energy consumption profile for each of a plurality of different sleep modes available for the device 200, 204. Again, the sleep modes consume power, but consume less power than a ready mode of the device 200, 204. Each energy consumption profile is based on power savings produced by the sleep mode and a transition power cost required to return from the sleep mode to the ready mode.

The processor 224 receives, through the interface 226, a probability distribution of interjob times for the device 200, 204. An interjob time is the time period between requests for activity made to the device 200, 204. Further, the processor 224 computes an optimal time-out period for each sleep mode based on the energy consumption profile of each the sleep mode and the probability distribution of interjob times. Each device 200, 204 automatically monitors the usage of the device 200, 204 to determine a current interjob time. Further, the processor 224 controls the device 200, 204 to automatically switch the device 200, 204 between the sleep modes to relatively lower power sleep modes as the current interjob time becomes larger based the optimal time-out period for each the sleep mode. Thus, the processor 224 controls the device 200, 204 to automatically switch from the ready mode to one of the sleep modes when the current interjob time reaches a shortest optimal time-out period produced by the computing of the optimal time-out period for each the sleep mode.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. Nos. 6,032,004, and 7,874,664 the complete disclosures of which are fully incorporated herein by reference. The embodiments herein can encompass embodiments that print in color, monochrome, or handle color or monochrome image data. All foregoing embodiments are specifically applicable to electrostatographic and/or xerographic machines and/or processes. Further, the terms automated or automatically mean that once a process is started (by a machine or a user) one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
    inputting, into a processor, an energy consumption profile for each of a plurality of different sleep modes available for a device, said device having a number of said sleep modes;
    inputting, into said processor, a probability distribution of interjob times for a number of different time-outs accepted by said device;
    automatically computing an optimal time-out period for each said consumption profile of each of said sleep modes using said processor based on said energy consumption profile of each of said sleep modes and said probability distribution of interjob times to limit a number of times an optimization calculation is performed to said number of said sleep modes multiplied by said number of different time-outs accepted by said device;
    automatically monitoring usage of said device to determine a current interjob time; and
    automatically switching, under control of said processor, between ones of said sleep modes to relatively lower power sleep modes as said current interjob time becomes larger based said optimal time-out period for each of said sleep modes.

2. The method according to claim 1, further comprising switching from a ready mode to one of said sleep modes when said current interjob time reaches a shortest optimal time-out period produced by said computing of said optimal time-out period for each of said sleep modes.

3. The method according to claim 1, said probability distribution of interjob times being dependent upon at least one of time of day, day of week, day of month, and day of year, said computing of said optimal time-out period for each of said sleep modes comprising computing different optimal time-out periods for at least one of different time of day, day of week, day of month, and day of year.

4. The method according to claim 1, further comprising computing said probability distribution of interjob times based on at least one of historical training data and empirical data.

5. The method according to claim 1, power savings produced by said sleep mode being relative to power consumption of a ready mode.

6. The method according to claim 1, further comprising returning to a ready mode from a current one of said sleep modes based on said device receiving requests for activity.

7. A method comprising:
    inputting, into a processor, an energy consumption profile for each of a plurality of different sleep modes available for a device, said device having a number of said sleep modes, said sleep modes consuming power and consuming less power than a ready mode of said device, each said energy consumption profile being based on power savings produced by said sleep mode and a transition power cost required to return from said sleep mode to said ready mode;
    inputting, into said processor, a probability distribution of interjob times for a number of different time-outs accepted by said device, an interjob time comprising a time period between requests for activity made to said device;
    automatically computing an optimal time-out period for each said consumption profile of each of said sleep modes using said processor based on said energy consumption profile of each of said sleep modes and said probability distribution of interjob times to limit a number of times an optimization calculation is performed to said number of said sleep modes multiplied by said number of different time-outs accepted by said device;
    automatically monitoring usage of said device to determine a current interjob time; and
    automatically switching, under control of said processor, between ones of said sleep modes to relatively lower power sleep modes as said current interjob time becomes larger based said optimal time-out period for each of said sleep modes.

8. The method according to claim 7, further comprising switching from said ready mode to one of said sleep modes when said current interjob time reaches a shortest optimal time-out period produced by said computing of said optimal time-out period for each of said sleep modes.

9. The method according to claim 7, said probability distribution of interjob times being dependent upon at least one of time of day, day of week, day of month, and day of year, said computing of said optimal time-out period for each of said sleep modes comprising computing different optimal time-out periods for at least one of different time of day, day of week, day of month, and day of year.

10. The method according to claim 7, further comprising computing said probability distribution of interjob times based on at least one of historical training data and empirical data.

11. The method according to claim 7, said power savings produced by said sleep mode being relative to power consumption of said ready mode.

12. The method according to claim 7, further comprising returning to said ready mode from a current one of said sleep modes based on said device receiving one of said requests for activity.

13. A method comprising:
    inputting, into a processor, an energy consumption profile for each of a plurality of different sleep modes available for a device, said device having a number of said sleep modes, said sleep modes consuming power and consuming less power than a ready mode of said device, each said energy consumption profile comprising a first vector representing power savings produced by said sleep mode and a second vector representing a transition power cost required to return from said sleep mode to said ready mode;

inputting, into said processor, a probability distribution of interjob times for a number of different time-outs accepted by said device, an interjob time comprising a time period between requests for activity made to said device;

automatically performing an optimization process using said processor to compute an optimal time-out period for each said consumption profile of each of said sleep modes using said probability distribution of interjob times to limit a number of times an optimization calculation is performed to said number of said sleep modes multiplied by said number of different time-outs accepted by said device;

automatically monitoring usage of said device to determine a current interjob time; and automatically switching, under control of said processor, between ones of said sleep modes to relatively lower power sleep modes as said current interjob time becomes larger based said optimal time-out period for each of said sleep modes.

14. The method according to claim 13, further comprising switching from said ready mode to one of said sleep modes when said current interjob time reaches a shortest optimal time-out period produced by said computing of said optimal time-out period for each of said sleep modes.

15. The method according to claim 13, said probability distribution of interjob times being dependent upon at least one of time of day, day of week, day of month, and day of year,
said computing of said optimal time-out period for each of said sleep modes comprising computing different optimal time-out periods for at least one of different time of day, day of week, day of month, and day of year.

16. The method according to claim 13, further comprising computing said probability distribution of interjob times based on at least one of historical training data and empirical data.

17. The method according to claim 13, said power savings produced by said sleep mode being relative to power consumption of said ready mode.

18. The method according to claim 13, further comprising returning to said ready mode from a current one of said sleep modes based on said device receiving one of said requests for activity.

19. A computerized device comprising:
an interface operatively connected to at least one device external to said computerized device; and
a processor operatively connected to said interface,
said processor receiving, through said interface, an energy consumption profile for each of a plurality of different sleep modes available for said device, said device having a number of said sleep modes, said sleep modes consuming power and consuming less power than a ready mode of said device, each said energy consumption profile being based on power savings produced by said sleep mode and a transition power cost required to return from said sleep mode to said ready mode;

said processor receiving, through said interface, a probability distribution of interjob times for a number of different time-outs accepted by said device, an interjob time comprising a time period between requests for activity made to said device;

said processor automatically computing an optimal time-out period for each said consumption profile of each of said sleep modes based on said energy consumption profile of each of said sleep modes and said probability distribution of interjob times to limit a number of times an optimization calculation is performed to said number of said sleep modes multiplied by said number of different time-outs accepted by said device;

said device automatically monitoring usage of said device to determine a current interjob time; and said processor automatically controlling said device to switch said device between ones of said sleep modes to relatively lower power sleep modes as said current interjob time becomes larger based said optimal time-out period for each of said sleep modes.

20. The computerized device according to claim 19, said processor controlling said device to switch from said ready mode to one of said sleep modes when said current interjob time reaches a shortest optimal time-out period produced by said computing of said optimal time-out period for each of said sleep modes.

21. The computerized device according to claim 19, said probability distribution of interjob times being dependent upon at least one of time of day, day of week, day of month, and day of year,
said computing of said optimal time-out period for each of said sleep modes comprising computing different optimal time-out periods for at least one of different time of day, day of week, day of month, and day of year.

22. The computerized device according to claim 19, said processor computing said probability distribution of interjob times based on at least one of historical training data and empirical data.

23. The computerized device according to claim 19, said power savings produced by said sleep mode being relative to power consumption of said ready mode.

24. The computerized device according to claim 19, said device returning to said ready mode from a current one of said sleep modes based on said device receiving one of said requests for activity.

25. The computerized device according to claim 19, said device comprising an electrostatic printing device.

* * * * *